Figure 1:
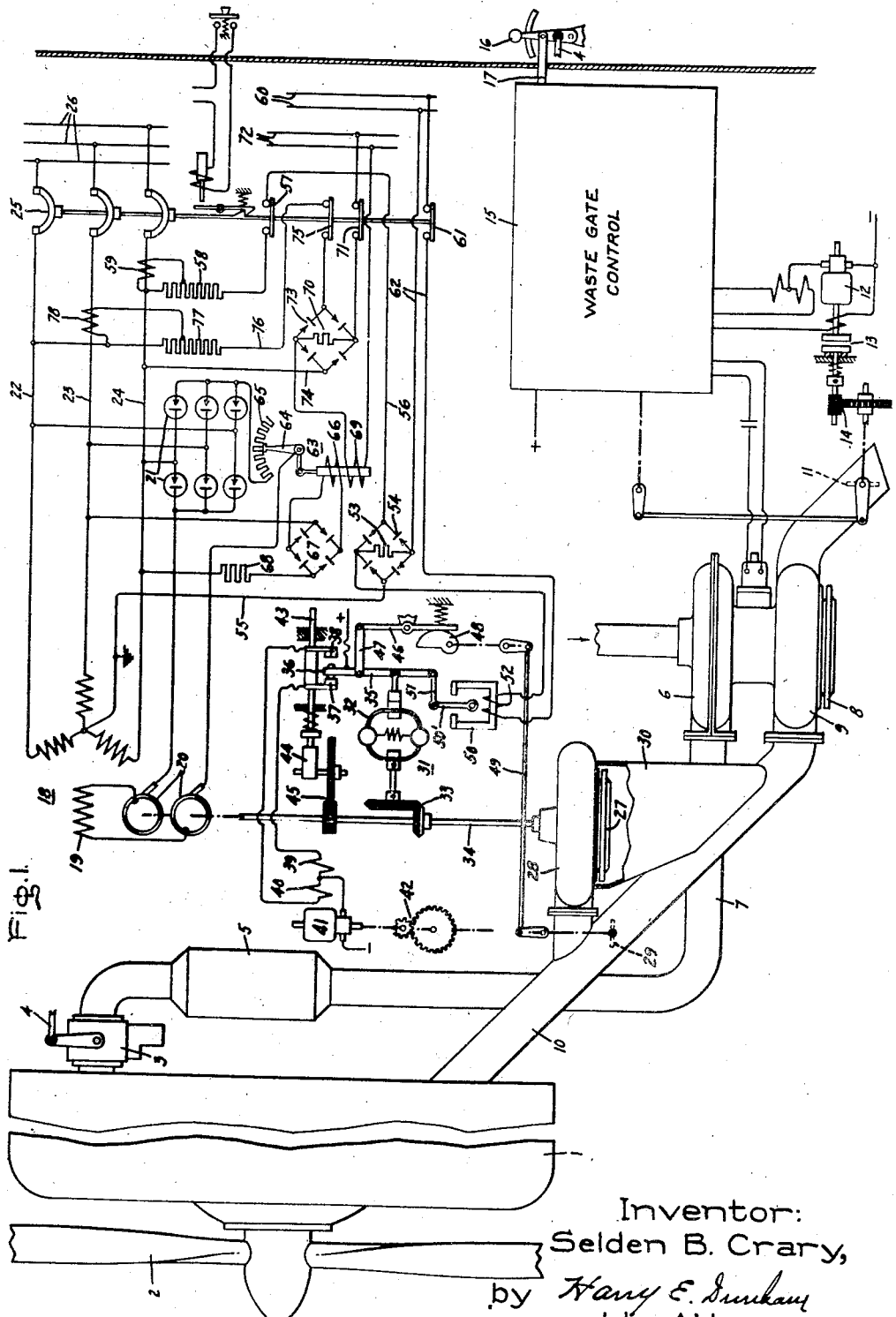

Patented Dec. 24, 1946

2,412,970

UNITED STATES PATENT OFFICE 2,412,970

SUPERCHARGED ENGINE EXHAUST POWER SYSTEM

Selden B. Crary, Schenectady, N. Y., assignor to General Electric Company, a corporation of New York Application December 6, 1944, Serial No. 566,909

19 Claims. (Cl. 290—4)

The invention relates to supercharged engine exhaust power systems, and provides improved engine turbosupercharger and electric turbogenerator combinative systems particularly adapted for converting engine exhaust power into electric power on aircraft under varying flight conditions.

The principal object is to provide an improved exhaust power driven turbogenerating system for an aircraft propelling turbosupercharged engine capable not only of utilizing excess expansive energy of the engine exhaust gases resulting from the decrease in the atmospheric pressure as the altitude increases, but also of converting a variable part of the available back pressure energy in the engine exhaust gases into electric power whenever required for energizing the electrically controlled and electrically operated devices used on the aircraft.

A special object is to provide an improved engine exhaust power system particularly adapted for synchronous or substantially constant speed operation of alternating current generators by the aircraft propelling turbosupercharged engines under widely varying flight conditions.

Such an improved alternating current generating system is desirable for aircraft, particularly on large supercharged multi-engine, long range, high altitude planes, since it will materially reduce the excessive conductor weight required by the low voltage, direct current systems now in common use, and also eliminate the excessive commutator brush wear that occurs at high altitudes and, in additoin, will effectively avoid commutator flashing and circuit interruption difficulties encountered at high altitudes with a high voltage, direct current aircraft power system. Furthermore, the improved system makes it feasible to obtain driving power from the exhaust gases of the supercharged aircraft propelling engines for operating the parallel connected alternating current generators or alternators synchronously at the required substantially constant frequency, which power cannot be obtained by any direct mechanical drive of the parallel connected alternating current generators since the propelling engines necessarily must operate at widely varying speeds under varying flight conditions.

It has been proposed heretofore to eliminate the parallel connection of the alternating current generators that necessitates the synchronous operation thereof, and instead connect each generator independently to supply a separate segregated electrical load. By this expedient, each alternating current generator can then be operated at independently varying speed by a direct mechanical drive from one of the variable speed aircraft propelling engines in the same way as in the parallel connected direct current generator systems now in common use. But such a segregated alternating current system is quite undesirable due to the impossibility of operating any of the aircraft electrical devices constituting a particular segregated electrical load upon failure of the corresponding generator driving engine as well as the impossibility of utilizing all the available aircraft electric power generating capacity to supply any electric load demand on the aircraft.

It also has been proposed to operate each parallel connected alternating current generator at the required synchronous frequency by means of a small auxiliary internal combustion engine running at a constant regulated speed entirely independently of the main variable speed aircraft propelling engines. But the resulting duplication of internal combustion engine power equipment and the increased maintenance involved, as well as the extra weight, space requirement, complexity and general unreliability inherent in such a separate auxiliary engine driven electric power system, also leave much to be desired.

Likewise, difficulties are prevalent in the variable speed hydraulic power transmission mechanism that has been proposed for operating each of the parallel connected alternating current generators at substantially constant speed from a corresponding one of the variable speed aircraft propelling engines. In addition to the power transmitting fluid maintenance difficulty, there is an excess weight problem involved, as well as the general complexity of the variable speed hydraulic power transmission control. Also, there is inherent difficulty in maintaining the alternating current generators synchronously in phase in case of rapid and uneven variations of either the aircraft propelling engine speeds or the generator loads due to the generally inflexible nature of any such noncompressible fluid power transmitting mechanism.

Hence, a particular object of the present invention is to provide an improved engine exhaust power system having a gas turbine connected in series gas flow relation between the engine and the engine turbosupercharger so as to obtain a very soft, flexible and substantially constant speed drive of an alternating current generator by partially expanding the exhaust gases supplied from the aircraft engine to the engine turbosupercharger. This enables the improved system more effectively to meet both the parallel connected alternating current generator and the propelling engine supercharger operating requirements, particularly under minimum available engine exhaust power conditions.

A further object is to provide an improved engine exhaust power control system suitable for parallel connected alternating current generators, each driven by a series connected turbine operated by the partial expansion of an automatically controlled part of the exhaust gases supplied from the aircraft propelling engine to operate the engine turbosupercharger with the flow and expansion of the exhaust gases specially regulated so as to be capable of providing synchronous operation of the generators at substantially constant frequency to balance the aircraft electric loads therebetween under all the widely and rapidly varying aircraft propelling and electrical power conditions likely to be encountered in flight.

A further object is to provide an improved primary and secondary exhaust gas turbine drive system for operating each electric generator and capable of operating primarily in parallel gas flow relation and secondarily in series gas flow relation with the engine turbosupercharger so as to minimize the increase in engine back pressure and generate the electric power required on the aircraft as far as possible from the excess energy available in the engine exhaust gases which otherwise, under normal flying conditions at high altitudes, would be wasted. In this way the overall engine fuel economy, and hence the effective operating range of the aircraft, can be materially increased.

A still further object is to provide a combinative automatic regulating system for both the exhaust gas turbine driven supercharger and generator, capable of sensitive and selective response both to varying electrical power conditions and to varying propelling engine supercharging power conditions so as to produce an efficient and substantially constant speed operation of the generator under varying electrical load, engine speed, and aircraft altitude conditions without adversely affecting the propelling power functions of the aircraft engine.

Figure 2:
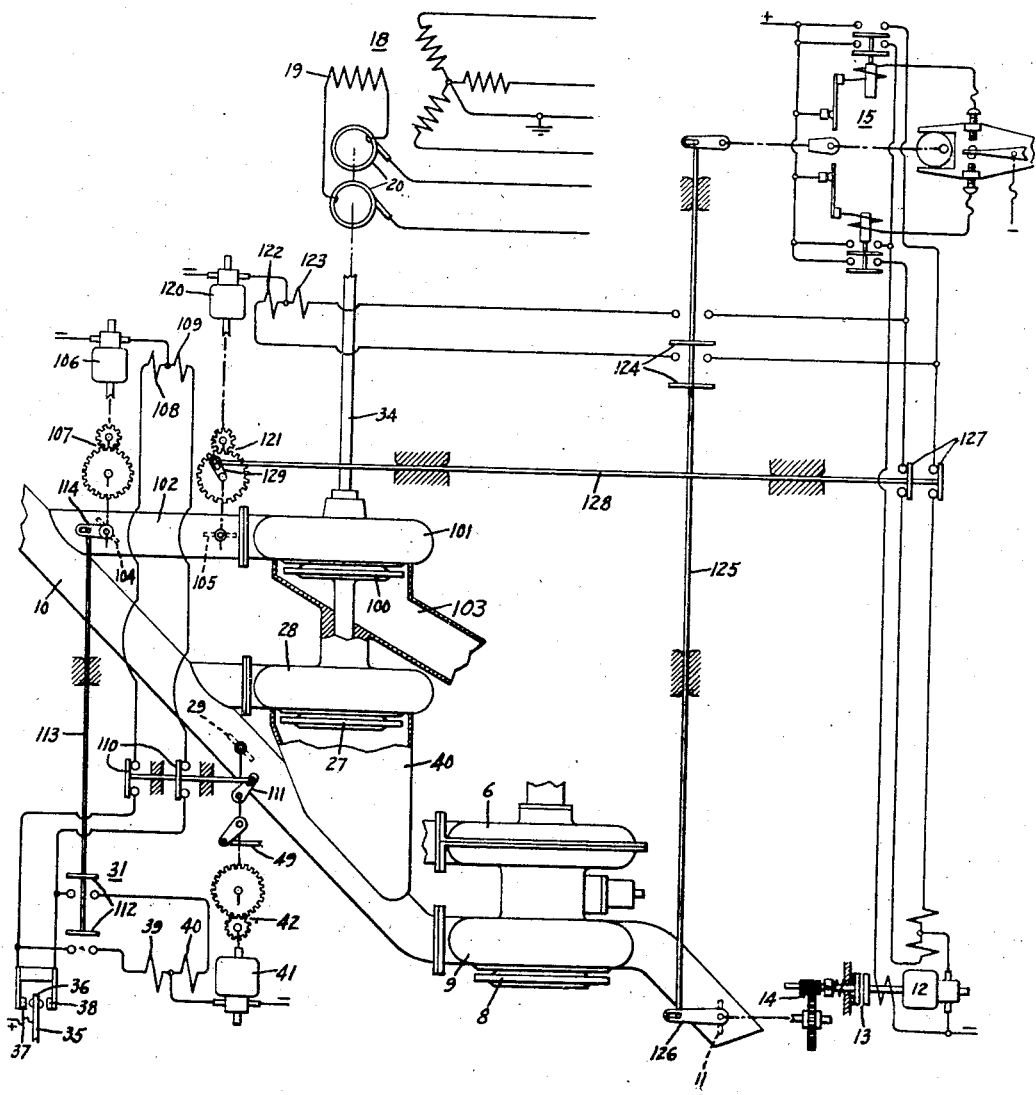

Further objects and advantages of the invention will appear in the description of the accompanying drawings in which Fig. 1 shows schematically an exhaust gas turbine driven, alternating current generating system for an aircraft propelling turbosupercharged engine embodying the improvements of the present invention, and Fig. 2 shows schematically a partial modified form of the system of Fig. 1 wherein the alternating current generator is operated by two exhaust gas driving turbines, one in parallel gas flow relation and the other in series gas flow relation with the engine turbosupercharger.

In Fig. 1, the aircraft propelling internal combustion supercharged engine 1 is shown schematically as of the well known radial type directly connected to drive the aircraft propeller 2. A suitable carburetor 3 is provided with a throttle valve mechanism 4 for regulating the aircraft propelling power developed by the engine 1 as required to meet varying flight conditions. The engine carburetor 3 is shown connected through the usual intercooler 5 to be supplied with air under pressure by the engine supercharger 6 through the conduit 7. The engine supercharger 6 is of the well known type driven by an exhaust gas turbine 8 having a nozzle box 9 supplied with engine exhaust gas through the supply conduit 10 that extends from the exhaust manifold of engine 1.

The speed and power of the supercharger driving turbine 8 are controlled by means of a waste gate 11 which is connected to the nozzle box 9 so as to by-pass gas from the turbine 8 and discharge the engine exhaust gases from the nozzle box 9 directly into the atmosphere. Thus, with waste gate 11 fully opened, practically all of the engine exhaust gases will pass through conduit 10 and the nozzle box 9 and discharge directly to atmosphere. But as the waste gate 11 is moved towards the closed position, more and more of the engine exhaust gases will be discharged through the supercharger driving turbine 8 until finally all the gases will discharge through turbine 8 when the waste gate 11 is fully closed.

The waste gate 11 is, in accordance with the usual practice, provided with some suitable form of automatic operating means that is responsive to the load demands of the supercharger 6 for variably opening and closing the waste gate 11 to vary the power produced by the turbine 8 and thereby the operating speed of the supercharger 6 in order to maintain the pressure of the air supplied to the engine carburetor 3 at a desired constant value or within a desired range as the altitude varies. As shown, the waste gate 11 is operated by a reversible electric motor 12 which is connected through the electromagnetic clutch 13 and suitable speed reducing gearing 14 to move the waste gate 11 to the open or closed positions or any intermediate position. The waste gate operating motor 12 may be provided with any well known form of automatic circuit control means, indicated generally by the reference character 15, which has a suitable bellows or diaphragm operated circuit controlling device automaticaly responsive to variation in the altitude at which the airplane engine 1 operates, and also electrical means responsive to the speed of the supercharger driving turbine 8 and, furthermore, can be manually adjusted so as to vary the speed of the supercharger driving turbine 8 in accordance with the desired propelling power output of the engine 1. Hence, the waste gate altitude responsive circuit control apparatus 15 is shown schematically interconnected to be controlled by the engine throttle lever 16 which operates the throttling valve mechanism 4 of carburetor 3 and, at the same time, through the connecting rod 17 sets or adjusts the altitude responsive circuit control apparatus 15 to increase or decrease the speed of the supercharger driving turbine 8 as the throttle valve 4 is operated to increase or decrease the propelling power of the engine 1. As the particular form of supercharger load responsive circuit control means 15 is not of the essence of the present invention and such means is known and in use, the details thereof are not shown. However, if desired, this control mechanism 15 may be of the improved type illustrated and described in the copending application Serial No. 481,444, assigned to the assignee of the present invention.

The alternating current generator 18 that forms a part of the improved aircraft turbogenerating system of the present invention is shown schematically as of the standard three-phase type having a rotating exciting field 19 energized with direct current through the slip rings 20 from any suitable source such, for example, as the three-phase double rectifiers 21 that are interconnected with the main alternating current supply lines 22, 23, 24 from the three-phase windings of the alternating current generator 18. These lines 22, 23 and 24 supply electric power through the three-phase circuit breaker 25 to the three-phase load supply busses 26 of the aircraft.

The power required to drive the rotating field 19 of the alternating current generator 18 is produced by the exhaust gas turbine 27 which, in accordance with the present invention, has the nozzle box 28 thereof connected to conduit 10 ahead of a throttle valve 29 which is mounted in the engine exhaust gas conduit 10 and has the turbine exhaust gas casing 30 connected with the engine exhaust supply conduit 10 on the other side of the throttle valve 29. In this way, the alternating current generator driving turbine 27 is connected in series gas flow relation with the supercharger driving turbine 8 so as to partially expand a variable part of the gases passing through conduit 10 under the control of the throttle valve 29. Thus, the alternating current generator driving turbine 27 can by-pass engine exhaust gases around the throttle valve 29 and produce a partial expansion of the engine exhaust gases supplied to the supercharger driving turbine with the throttle valve 29 controlling the partial expansion to regulate the power produced by the generator driving turbine 27.

With the improved construction illustrated, there are in effect two parallel exhaust supply conduits for the supercharger driving turbine 8 with the generator driving turbine 27 operating in response to the flow of exhaust gas through one of the parallel conduits and the throttle valve 29 controlling the gas flow in the other parallel conduit. Hence, when throttle valve 29 is open, there is practically no restriction to the flow of gas directly through the conduit 10 to the supercharger turbine 8, and the back pressure of the engine exhaust gases is then dependent practically entirely upon the degree of closure of the waste gate 11. However, as the throttle valve 29 is moved towards the closed position, the engine exhaust gases are thereby forced to flow through the generator driving by-pass turbine 27 so as to cause the generator driving turbine to produce power in accordance with the pressure drop produced by the throttle valve 29. In this way the engine back pressure is increased a corresponding amount substantially independently of waste gate 11. Thus, it will be seen that, in the improved system, the throttle valve 29 constitutes a by-pass control around the generator driving turbine 27 and the waste gate valve 11 constitutes a by-pass control around the supercharger driving turbine 8 and each is capable of controlling the power produced by the corresponding turbine substantially independently of the other.

The throttle valve 29 is in accordance with the present invention provided with automatic operating means responsive to conditions appurtenant to the generator 18 and indicated generally by the reference character 31. As shown, these means include a generator speed responsive governor 32 which may be of the centrifugal spring biased type indicated schematically in the drawings and driven by means of suitable gearing 33 from the drive shaft 34 of the rotating generator field 19 that is connected to be driven by the driving turbine 27. The speed responsive governor 32 is suitably connected to operate a movable control arm 35 which carries at one end thereof the movable circuit control contacts 36 for oscillation between the cooperating control contacts 37 and 38. These contacts selectively control the energization of the reversing field windings 39 and 40 of the reversible motor 41 that is connected through suitable gearing 42 to operate the throttle valve 29 between open and closed positions responsively to variations in the generator speed from a desired critical synchronous value so as thereby to maintain the speed substantially constant.

In order to increase the sensitivity and accuracy of control, the cooperating contacts 37 and 38 preferably are mounted for oscillation with a rod 43 which, as shown, is slidably mounted in suitable bearings with the left-hand end thereof spring biased into operative engagement with a rotating actuating cam 44 that is driven through suitable gearing 45 from the driven shaft 34. In this way, continuous periodic oscillation of the cooperating contacts 37, 38 is produced upon rotation of the drive shaft 34. Such oscillation periodically makes and breaks the energizing circuit of each of the reversing field windings 39 and 40 at frequent recurring intervals and thereby enables the reversible motor 41 to position the throttle valve 29 in the engine exhaust gas supply duct 10 very accurately.

In order to introduce an anti-hunting follow-up action into the positioning control of the throttle valve 29, a lever 46 is pivotally supported intermediate its ends and interconnected at one end by the link 47 with the movable contact control arm 35. The opposite end of the lever 46 is biased by a suitable spring into engagement with a graduated operating cam 48 which is interconnected by a suitable lever and link mechanism 49 to be rotated proportionately to the opening and closing movements of the throttle valve 29 in the engine exhaust gas conduit 10. In this way, a follow-up action is obtained such that whenever the motor field winding 39 is energized by engagement of contact 36 with cooperating contact 37 to energize the motor 41 to move the throttle valve 29 slightly toward the open position, the resulting movement of cam 48 serves to move the lever 46 and link 47 in a direction to disengage the movable contact 36 from the cooperating contact 37. Likewise, when the movable contact 36 engages with the cooperating contact 38 to energize the motor field winding 40 so as to operate the motor 31 in the reverse direction to move the throttle valve 29 slightly towards the closed position, then a corresponding movement of cam 48 operates through lever 46 and link 47 to disengage contact 36 from the cooperating contact 38. This follow-up anti-hunting action cooperates with the continuous oscillation of the cooperating contacts 37, 38 so that a very sensitive and accurate anti-hunting control of the position of the throttle valve 29 is obtained.

In order also to control the position of the throttle valve 29 in response to variations in the electrical load of the generator 18, an electroresponsive control element 50 responsive to a load condition of the generator is provided. As shown schematically in the drawings, this electroresponsive load control element 50 operates an armature 50' which is interconnected through the link 51 with the movable contact arm 35. The device 50 is provided with an energizing winding 52 that is connected to be energized in accordance with the kilowatt output of the alternating current generator 18 by means of an electrical conducting element 53. As shown, a bridge connection of the rectifier unit 54 is provided for superimposing upon the electrically conducting element 53 an energization component equal to the kilowatt output of the generator 18. One leg of the rectifier bridge is connected through the conductor 55 with the neutral or grounded point of the three-phase generator windings. The other leg of the rectifier unit 54 is interconnected to the conductor 56, and the auxiliary switch 57 and resistor 58 with the generator power supply line 24. The current transformer 59 circulates a current through a portion of the resistor 58 proportional to the alternating current flowing in the supply line 24. In this way the current component is combined with the neutral to line voltage component to provide an energization of the conducting element 53 in accordance with the kilowatt output of the generator.

It will be understood that each of the other propelling engines of a multi-engine aircraft is provided with a turbosupercharger and turbogenerator combination identical with that just described and illustrated in Fig. 1, with all of the three-phase alternating current generators connected in parallel through the common three-phase power busses 26 from which the electrical load demands of the aircraft are supplied.

Since the alternating current generator 18 is connected to busses 26 for operation in parallel with other similar alternating current generators, to equalize the electrical load on the generators, the energization of the operating winding 52 preferably is made responsive to the unbalanced kilowatt load of the corresponding generator by interconnecting the electrical conducting element 54 to an average kilowatt bus 60 through the auxiliary switch 61 and the conductors 62. In this way, whenever the kilowatts produced by generator 18 are below the average produced by the other parallel connected generators, the operating winding 52 of the electroresponsive control device 50 becomes energized to move the armature 50' in a left-hand direction so as to operate the contact arm 35 to engage contact 36 with the cooperating contact 38 and thereby effect operation of motor 31 in a direction to close throttle valve 29 and thereby increase the power produced by the generator driving turbine 27 in order to equalize the kilowatt output of generator 18 with the average of the other parallel connected generators. In case, however, the kilowatt output of generator 18 is above the average output of the other generators, then the operating winding 52 is oppositely energized so as to move the armature 50' in the opposite direction and thereby control the motor 31 to effect an opening of the throttle valve 29 and, in this way, reduce the power produced by the generator driving turbine 27.

The voltage of the alternating current generator 18 preferably is automatically maintained at a desired value by means of an automatic voltage regulator mechanism, indicated generally by the reference character 63. As shown, the voltage regulator 63 has a contact arm 64 for variably controlling the resistance 65 that is connected in the circuit through which the field winding 19 is energized from the double rectifiers 21. One operating winding of the voltage regulator 63 is energized in accordance with the voltage between the phase conductors 23 and 24 by means of the bridge connected rectifier arrangement 67 and the regulating resistor 68. A second operating winding 69 of the voltage regulator 63 is energized in accordance with the differential between the reactive volt-amperes of generator 18 and the average reactive volt-amperes of the other parallel connected generators. This is accomplished by interconnecting the voltage regulator operating winding 69 through an electrical conducting element 70 and the auxiliary switch 71 with the reactive volt-ampere bus 72 and superimposing upon the conducting element 70 a component indicative of the reactive volt-ampere characteristic of generator 18. This latter is accomplished by means of the rectifier bridge 73 having the mid-point of one leg connected directly to the generator line conductor 24, through conductor 74, and the mid-point of the other leg connected through auxiliary switch 75, conductor 76, resistor 77, to the other generator line conductor 22. The current transformer 78 is connected to circulate a current through a portion of resistor 77 in accordance with the current flow through the generator phase conductor 23. With this connection arrangement, whenever the reactive volt-amperes of the generator 18 are above or below the average of the reactive volt-amperes of the other parallel connected generators, each of which, it will be understood, has a similar interconnection with both the power supply bus 26 and the equalizing busses 60 and 72, then the voltage regulator operating winding 69 is energized in one way or the other so as to act cumulatively or differentially with respect to the voltage responsive operating winding 66. In this way, the voltage and speed of the generator 18 are automatically controlled so as to equalize both the kilowatt and the reactive volt-ampere loads thereof with that of the other parallel connected generators.

With the improved turbosupercharger and alternating current electric turbogenerator combinative system schematically shown in Fig. 1 of the drawings, when the airplane is preparing to take off or land, or operating at relatively low altitudes, the supercharger load requirements normally will not be very large and waste gate 11 will be partially open except, perhaps, during acceleration of the propelling engines for take-off or similar full power manoeuvres. Thus, there is always ample available energy in the engine exhaust gases not only to operate the supercharger driving turbine 8 to produce sufficient power to drive the supercharger 6 at the speed required to meet the normal supercharger load demands, but also to operate the generator driving turbine 27 in order to drive the generator 18 to supply the normal electrical load demands. Under such normal operating conditions, the supercharger load responsive control means 15 operates the waste gate 11 in accordance with variations in the supercharger load demands, and the control means 31 operates the throttle valve 29 in accordance with variations in the generator load demands. Any increase in engine back pressure due to the partial expansion of the engine exhaust gases in the generator driving turbine 27 is not likely to become excessive unless there should be, for some reason, an abnormally large electrical demand imposed on the generating system simultaneously with a large supercharger load demand while the engine exhaust power output is very low as, for example, due to a quick manual increase in the setting of the supercharger load responsive control to increase the power output of the propelling engine 1 from the minimum to the maximum. However, this is not likely to occur except in an emergency, particularly if the generator power output is properly limited so as not to adversely affect the propelling engine performance under any normal operating condition.

Whenever the aircraft is operating at high altitudes, the increased expansive energy in the engine exhaust gases due to the decrease in atmospheric pressure then becomes available for supplying without any excessive engine back pressure not only the supercharger load demands, but also the generator load demands. Thus, on long flights at high altitudes, with the propelling engine 1 operating at normal rated or cruising power, the generation of electric power for use on the aircraft can be obtained largely from the excess exhaust energy which otherwise would be wasted.

In Fig. 2 is shown a partial modification of the turbosupercharger and turbogenerator combinative system shown in Fig. 1 that may be employed more effectively to utilize the excess expansive energy in the exhaust gases at high altitudes, while at the same time retaining the ability to convert a variable part of the available back pressure energy in the engine exhaust gases into electric power whenever required for energizing the electrically controlled and electrically operated devices used in the aircraft. In Fig. 2, it will be understood that the supercharger 9 and the supercharger driving turbine 8 are interconnected with the aircraft propelling engine 1 in identically the same way as shown in Fig. 1, although various parts of the system have been omitted for the sake of clarity. Likewise, in Fig. 2 the generator driving turbine 27 is interconnected with the engine exhaust gas supply conduit 10 in identically the same manner as previously described in connection with Fig. 1. However, Fig. 2 shows an additional generator driving turbine 100 connected with the generator drive shaft 34 for producing power to separately drive the generator whenever the engine exhaust power is more than sufficient to supply the power demands of the supercharger driving turbine 9. Under such conditions, the waste gate 11 ordinarily would be partially open.

The additional generator driving turbine 100 has a nozzle box 101 connected through conduit 102 to receive gases from the engine exhaust gas supply conduit 10 ahead of the throttling valve 29 which controls the power produced by the generator driving turbine 27. Thus the additional generator driving turbine 100 is connected in parallel gas flow relation with both the generator driving turbine 27 and the supercharger driving turbine 8, and the gases supplied from the exhaust gas supply conduit 10 and passing through the generator driving turbine 100 are exhausted directly to the atmosphere through the exhaust casing 103. Thus, it will be seen that, in effect, the generator driving turbine 27 is connected in series gas flow relation with the supercharger driving turbine 8, while the additional generator driving turbine 100 is connected in parallel gas flow relation with the supercharger driving turbine 8.

In accordance with the present invention, the parallel turbine 100 is operated to produce all the power required to drive the generator as long as there is excess power in the engine exhaust gases beyond the power demands of the supercharger driving turbine 8, as indicated by a partial opening of the waste gate 11. This insures a minimum engine back pressure in the exhaust gas supply conduit 10 and thereby increases the aircraft propelling engine operating efficiency. However, in case the generator load demands should require more power than can be produced by the parallel turbine 100, then the series turbine 27 becomes operative to produce the required additional driving power by increasing the engine back pressure and thereby converting a variable part of the available energy in the exhaust gases into electric power.

The power produced by the parallel turbine 100 is controlled by suitable throttling means for restricting the flow of exhaust gases through the conduit 102 to the nozzle box 101. As shown in Fig. 2, two throttle valves 104 and 105 are provided. The throttle valve 104 is operated by reversible electric motor 106 through suitable speed reducing gearing 107. The operating motor 106 is provided with the field winding 108 for operating the motor in a direction to close throttling valve 104 and with the field winding 109 for operating the motor in the direction to open throttling valve 104.

In accordance with the present invention, the reversing field windings of motor 106 are selectively controlled by the automatic generator control apparatus 31, operating arm 35 and control contacts 36, 37 and 38 of which are shown in Fig. 2. These contacts are connected to selectively energize one or the other of the field windings 108 and 109 whenever the auxiliary switches 110 are in the closed position, as shown. The auxiliary switches 110 are operated by means of a suitable lever 111, shown schematically on the shaft of the throttle valve 29, so as to close the auxiliary switches 110 whenever throttle valve 29 is in the full open position, as shown in Fig. 2.

The operating motor 41 for throttle valve 29 also is selectively controlled by the generator condition responsive control apparatus whenever the auxiliary switches 112 are closed. These auxiliary switches 112 are operated by a rod 113 and a lever 114, which is shown connected to the operating shaft of the throttle valve 104 so as to close the auxiliary switches 112 whenever throttle valve 104 is in the fully open position.

The throttle valve 105 is operated by reversible motor 120 through suitable speed reducing gearing 121. When the motor field winding 122 is energized, motor 120 operates in a direction to close the throttling valve 105 but when motor field winding 123 is energized, the motor 120 operates in a direction to open throttle valve 105.

In accordance with the present invention, the two motor field windings 122 and 123 are connected to be selectively energized upon closure of the auxiliary switches 124 under the control of the supercharger load responsive means 15 which normally controls the selective energization of the field windings of the waste gate operating motor 12. The auxiliary switches 124 are closed by means of the operating rod 125 and lever 126 which is shown connected to the shaft of the waste gate 11 so as to close the auxiliary switches 124 whenever waste gate 11 becomes substantially closed. The auxiliary switches 127 are provided for connecting the waste gate operating motor 12 to be selectively controlled by the supercharger load responsive apparatus 15 when throttling valve 105 is in the full open position by means of the rod 128 and the lever 129 which, as shown, is connected to the operating shaft of the throttle valve 105.

*Operation of Fig. 2*

With the various control elements in their respective positions shown in Fig. 2, the waste gate 11 is partially open and the throttle valve 104 is partially open, while both the throttle valves 29 and 105 are fully open. Under these conditions, exhaust gas is supplied from the conduit 10 to operate the supercharger driving turbine 8 with the power developed thereby under the control of the waste gate 11 and with the operation of the waste gate 11 under the control of motor 12 and the supercharger load responsive apparatus 15. At the same time, exhaust gas is supplied from conduit 10 to operate the generator driving parallel turbine 100 with the power produced thereby under the control of the throttling valve 104 and with the positioning of the valve under the control of motor 106 and the generator load responsive control represented by the contacts 36, 37 and 38. It will be understood that, in case the supercharger load demands increase or decrease, then the supercharger load responsive control 15 will effect operation of motor 12 in a corresponding direction to close or open waste gate 11 the amount required to enable the supercharger driving turbine 8 to meet the load demands. Similarly, in case the generator load demands increase or decrease, contact 36 will selectively engage with either cooperating contact 37 to energize motor 106 for operation in a direction to open throttle valve 104, or with contact 38 to energize motor 106 for operation in a direction to close throttle valve 104 so as to vary the power produced by the parallel turbine 100 to meet the generator load demands and maintain the operating speed of the generator substantially constant. Under these conditions, the series turbine 27 is inactive since throttle valve 29 is fully open. Hence, the engine back pressure is controlled jointly by the position of the waste gate valve 11 and the throttle valve 104.

Assuming now that the supercharger load requirements are such as to maintain waste gate 11 partially open but that the generator load requirements increase to the point where throttle valve 104 reaches the fully open position, thereupon auxiliary switches 112 are closed and, upon any further increase of the generator load demands, the engagement of movable contact 36 with cooperating contact 37 will energize motor 41 through field winding 39 to operate throttle valve 29 from the fully open position in which it is shown towards the closed position. This produces a pressure differential on the opposite sides of the throttle valve 29 and the series turbine 27 begins to produce power in response to the amount of the pressure differential. In this way, both the parallel turbine 100 and the series turbine 27 operate to jointly supply power to the generator drive shaft 34, with the amount of power supplied by turbine 100 controlled jointly by the waste gate 11 and throttling valve 29 since both throttling valves 104 and 105 are in the fully open position. The amount of the additional power supplied by series turbine 27 is under the independent control of throttle valve 29. The movement of throttling valve 29 from the fully open position effects the opening of the auxiliary switches 110 thereby transferring the control of the generator load responsive control means 41 from motor 106 to motor 41. Thus, whenever waste gate 11 is partially open and throttle valve 104 is fully open, throttle valve 29 is operated under the control of the generator load responsive means so as to balance the power jointly produced by the parallel turbine 100 and the series turbine 27 with the generator load requirements and the waste gate 11 is operated by motor 12 under the control of the supercharger load responsive means 15 to balance the power produced by the supercharger driving turbine 8 with the supercharger load requirements.

In case the supercharger load requirements should increase to the point where waste gate 11 becomes substantially closed, then auxiliary switches 124 are closed. This transfers the control of the supercharger load responsive control means 15 from motor 12 to motor 120. Thereupon, any further increase in the supercharger load requirements will result in energization of motor 120 through field winding 123 so as to operate throttle valve 105 from the fully open position in which it is shown towards the closed position. This results in increasing the pressure of the gases in exhaust gas supply conduit 10, with a resultant increase in the power developed by the supercharger driving turbine 8. The movement of throttle valve 105 from the full open position effects the opening of auxiliary switches 127 thereby disconnecting motor 12 from the supercharger load responsive circuit control means 15.

Since the movement of throttle valve 105 toward the closed position under the control of the supercharger load responsive circuit controlling means 15 reduces the power produced by the generator driving turbine 100, the generator load responsive means will effect further closing of the throttling valve 29 to further increase the power produced by the generator driving series turbine 27 so as to balance the power produced with the load requirements. In the extreme case that throttle valve 105 should become substantially closed, then the throttle valve 29 necessarily will close sufficiently to enable the generator driving series turbine 27 to produce substantially all of the power required to meet the generator load requirements. This condition is not likely to occur except upon an excessive electrical load demand during cruising with reduced engine power output at very high altitudes or during takeoff when there is insufficient excess exhaust power over the supercharger driving turbine requirements to carry an excessive electrical load demand. However, the present invention insures, even under these extreme conditions, the production of sufficient power to meet all the load demands even though the engine back pressure may be increased temporarily to a value which would be undesirable if sustained.

From the foregoing, it will be seen that, under all normal operating conditions, the parallel turbine 100 operates to efficiently utilize any excess energy in the exhaust gases that would otherwise be wasted due to the waste gate 11 being partially open. However, under extreme conditions when the waste gate 11 is closed, the improvements of the present invention enable the additional available back pressure energy in the exhaust gases to be utilized to supply the electrical load demands.

What I claim as new and desire to secure by Letters Patent of the United States is:

1. In a supercharged engine exhaust power system, the combination with an engine supercharger driving turbine, of means including a separate turbine connected to supply partially expanded engine exhaust gases to said supercharger driving turbine, and an electric generator driven by said separate turbine and having electroresponsive means energized thereby for controlling the partial expansion of said gases.

2. In a supercharged engine exhaust power system, the combination with an engine supercharger driving turbine having means for regulating the pressure of the engine exhaust gases supplied thereto of a generator having a driving turbine connected to partially expand the exhaust gases supplied to said first turbine, and means responsive to the generator load for regulating said partial expansion.

3. In combination, an engine exhaust gas driven turbo-supercharger having an exhaust gas supply throttling valve and a waste gate valve and an electric generator having an exhaust gas driving turbine provided with means for connecting the inlet and outlet thereof on opposite sides of said throttling valve for operation under the control thereof.

4. In combination, an engine supercharger driving turbine, a generator having an exhaust gas driving turbine connected to supply partially expanded gases to said first turbine, and separately operable automatic by-pass control means for each turbine to provide substantially independent control of the operating speed thereof.

5. In combination, an engine supercharger driving turbine having an exhaust gas supply conduit provided with a throttling valve and a separate waste gate valve having operating means responsive to a condition appurtenant to said supercharger for regulating the speed of said turbine, an electric generator having a separate driving turbine connected with said conduit to by-pass said throttling valve, and means responsive to a condition appurtenant to said generator for controlling said throttling valve to regulate the speed of said separate turbine.

6. In an aircraft supercharged engine exhaust power system, the combination with an engine supercharger driving turbine having supercharger load responsive means for regulating the pressure of the engine exhaust gases supplied thereto of an alternating current generator having a driving turbine connected to partially expand the gases supplied to said first turbine, and means jointly responsive to the load and speed of said generator for regulating said partial expansion.

7. In a supercharged engine exhaust power system, the combination with an engine supercharger and a turbine for expanding engine exhaust gases to drive said supercharger, of a separate turbine connected for partially expanding said gases and having an electric power generator driven thereby, and a pair of exhaust gas by-pass control valves, one having operating means responsive to a condition appurtenant to said supercharger, and the other having operating means responsive to a condition appurtenant to said generator, and each connected for independently by-passing gases from a corresponding one of said turbines.

8. In a supercharged engine exhaust power system, the combination with an engine turbo-supercharger having a pair of parallel exhaust gas supply conduits, a separate exhaust gas turbine connected to be operated by exhaust gas flow in one of said conduits and having an electric power generator driven thereby, a waste gate having automatic control means responsive to a supercharger condition for regulating the flow of exhaust gases from both said conduits to regulate the power developed by said supercharger turbine, and automatic control means responsive to a generator power condition for throttling the flow of gases in the other of said conduits to vary the power produced by said generator driving turbine.

9. In an aircraft supercharged engine exhaust power system, the combination of an engine supercharger driving turbine, an exhaust gas turbine having an electric generator driven thereby and having outlet connections for supplying partially expanded exhaust gases to said supercharger driving turbine, altitude responsive exhaust gas control means for varying the speed of said supercharged driving turbine, and generator load and speed responsive exhaust gas control means for varying the power produced by said generator driving turbine at substantially constant speed.

10. In an aircraft supercharged engine exhaust power system, the combination with an engine supercharger having a driving turbine provided with automatic control means responsive to an engine operating condition for regulating the inlet pressure of said turbine, of means including an engine exhaust gas turbine having an electric generator driven thereby and having outlet connections for supplying partially expanded exhaust gases to said supercharger driving turbine, and means responsive to an electrical condition of said generator for separately regulating the inlet pressure of said generator driving turbine to convert a variable part of the energy in said gases into electric power substantially independently of said supercharger driving turbine control means.

11. In an aircraft power system, the combination with engine power regulating means including a supercharger having a driving turbine provided with a waste gate for by-passing engine exhaust gases therefrom, of separate means for regulating the pressure of said gases including a turbine provided with by-pass valve means for partially expanding said gases and having an electric generator driven thereby and means responsive jointly to the load and speed of said generator for controlling said by-pass valve means to convert a variable part of the energy in said gases into electric power.

12. In a supercharged engine exhaust power system, the combination of an engine supercharger driving turbine, means including a waste gate for controlling the power produced by said turbine, and an electric generator having a pair of exhaust gas driving turbines therefor, one connected for operation in parallel gas flow relation with said supercharger driving turbine and having separately operable exhaust gas flow control means for regulating the power produced thereby, and the other connected in series gas flow relation with said supercharger driving turbine for partially expanding the exhaust gases supplied thereto and having separately operable exhaust gas flow control means for controlling said partial expansion to regulate the power produced thereby.

13. In a supercharged engine exhaust power system, the combination of an engine supercharger driving turbine having means including a waste gate for controlling the power produced thereby, and an electric power generator having a pair of exhaust gas driving turbines therefor, one connected in series gas flow relation with said supercharger driving turbine for partially expanding the exhaust gases supplied thereto and having means including a by-pass valve for controlling said partial expansion to regulate the power produced by said one turbine and the other connected in parallel gas flow relation with said series connected turbines for operation under the joint control of said waste gate and said by-pass means and having means including a separate exhaust gas throttling valve for regulating the power produced thereby.

14. In a supercharged engine exhaust power system, the combination of an engine supercharger driving turbine, means including a waste gate for controlling the power produced by said turbine, and an electric generator having a pair of exhaust gas driving turbines therefor, one connected for operation in parallel gas flow relation with said supercharger driving turbine and having separately operable exhaust gas flow control means for regulating the power produced thereby, and the other connected in series gas flow relation with said supercharger driving turbine for partially expanding the exhaust gases supplied thereto and having separately operable exhaust gas flow control means for controlling said partial expansion to regulate the power produced thereby, and means including a device responsive to variations in a condition appurtenant to said generator for successively operating said separately operable exhaust gas flow control means in a predetermined reversible sequence upon opposite variations in said condition.

15. In a supercharged engine exhaust power system, the combination of an engine supercharger driving turbine, means including a waste gate for controlling the power produced by said turbine, and an electric generator having a pair of exhaust gas driving turbines therefor, one connected in parallel gas flow relation with said supercharger driving turbine and having control means interlocked with said waste gate for regulating the power produced thereby only while said waste gate is open, and the other connected for partially expanding the exhaust gases supplied to said supercharger driving turbine, and having control means interlocked with said waste gate for controlling said partial expansion to regulate the power produced thereby only while said waste gate is substantially closed.

16. In combination, an engine supercharger driving turbine having an exhaust gas supply conduit provided with a main throttling valve and a waste gate valve having operating means responsive to variations in a supercharger condition for regulating the speed of said turbine, an electric generator having a primary driving turbine connected to receive gas from said conduit ahead of said main throttling valve and provided with a separate throttling valve and having a secondary driving turbine connected with said conduit to by-pass gas around said throttling valve, and a control device responsive to variations in a condition appurtenant to said generator and having means for successfully operating said separate and main throttling valves in a predetermined reversible sequence to control the power produced by the corresponding generator driving turbines in accordance with variations in the load of said generator.

17. In a supercharged engine exhaust power system, the combination of an engine supercharger driving turbine, a waste gate for controlling the power produced by said turbine supercharger load responsive means for operating said waste gate, an electric generator having a pair of exhaust gas driving turbines therefor, one connected for operation in parallel gas flow relation with said supercharger driving turbine and having separately operable exhaust gas flow control means for regulating the power produced thereby and the other connected in series gas flow relation with said supercharger driving turbine for partially expanding the exhaust gases supplied thereto and having separately operable exhaust gas flow control means for controlling said partial expansion to regulate the power produced thereby, means including a device responsive to variations in the load of said generator for separately operating said separately operable exhaust gas flow control means in a predetermined sequence to vary the power produced by the corresponding turbines in accordance with variations in the load of said generator, and overriding means under the control of said supercharger load responsive means for varying the power produced by said parallel connected turbine inversely in accordance with variations in the supercharger load whenever said waste gate is substantially closed.

18. In a supercharged engine exhaust power system, the combination of an engine supercharger driving turbine having a waste gate and supercharger load responsive means for variably closing and opening said waste gate to vary the power produced by said turbine, an electric generator having a primary driving turbine connected in parallel gas flow relation with said series connected turbines and provided with primary throttling control means for regulating the power produced thereby, and having a secondary driving turbine connected in series gas flow relation with said supercharger driving turbine for partially expanding the exhaust gases supplied thereto and provided with secondary throttling control means for controlling said partial expansion to regulate the power produced by said secondary turbine, a generator load responsive device having means for successively operating said primary and secondary throttling control means in a predetermined reversible sequence to control the power produced by the corresponding generator driving turbines in accordance with variations in the load of said generator, and overriding control means under the control of said supercharger load responsive means for varying the power produced by said parallel gas flow connected turbine inversely in accordance with variations in the supercharger load whenever said waste gate is substantially closed.

19. In combination, an engine supercharger driving turbine having an exhaust gas supply conduit provided with a main throttling valve and a separate waste gate valve having control means responsive to a supercharger load condition for regulating the speed of said turbine, an electric generator having one driving turbine connected to receive gas from said conduit ahead of said main throttling valve and provided with a separate throttling valve and a second driving turbine connected with said conduit to by-pass said main throttling valve, a control device responsive to a load condition of said generator and having means for separately operating said separate and main throttling valves in a predetermined sequence to control the power produced by the corresponding generator driving turbines in accordance with variations in the load of said generator, and overriding control means including a second throttling valve for said one turbine having operating means under the control of said supercharger load responsive control means for varying the power produced by said one turbine inversely in accordance with variations in the supercharger load whenever said waste gate is substantially closed.

SELDEN B. CRARY.